(12) United States Patent
Mariani et al.

(10) Patent No.: US 7,266,225 B2
(45) Date of Patent: Sep. 4, 2007

(54) FACE DIRECTION ESTIMATION USING A SINGLE GRAY-LEVEL IMAGE

(75) Inventors: Roberto Mariani, Singapore (SG); Jiankang Wu, Singapore (SG)

(73) Assignee: Agency For Science, Technology and Research, Singapore (SG)

( * ) Notice: Subject to any disclaimer, the term of this patent is extended or adjusted under 35 U.S.C. 154(b) by 307 days.

(21) Appl. No.: 10/664,122

(22) Filed: Sep. 17, 2003

(65) Prior Publication Data

US 2004/0062424 A1 Apr. 1, 2004

(51) Int. Cl.
  G06K 9/00 (2006.01)
  G06K 9/64 (2006.01)
  G06K 9/32 (2006.01)
  G06K 9/62 (2006.01)

(52) U.S. Cl. .................. 382/118; 382/278; 382/295

(58) Field of Classification Search .............. 382/118, 382/115, 156, 160, 172, 190, 206, 226, 278, 382/293–296; 348/51, 169, 14.08, 14.1, 348/14.03; 351/204; 304/5.8, 5.81, 5.83
See application file for complete search history.

(56) References Cited

U.S. PATENT DOCUMENTS

| 5,293,427 | A | 3/1994 | Ueno et al. ................. 382/1 |
| 5,481,622 | A | 1/1996 | Gerhardt et al. ............ 382/103 |
| 5,561,718 | A | 10/1996 | Trew et al. ................. 382/118 |
| 5,659,625 | A | 8/1997 | Marquardt .................. 382/118 |
| 5,774,591 | A | 6/1998 | Black et al. ................ 382/236 |
| 5,859,921 | A | 1/1999 | Suzuki ...................... 382/118 |
| 5,867,588 | A | 2/1999 | Marquardt .................. 382/118 |
| 6,249,292 | B1* | 6/2001 | Christian et al. ........... 345/473 |
| 6,580,811 | B2* | 6/2003 | Maurer et al. .............. 382/103 |
| 6,677,969 | B1* | 1/2004 | Hongo ....................... 715/863 |
| 6,766,299 | B1* | 7/2004 | Bellomo et al. ............ 704/276 |
| 2003/0048930 | A1* | 3/2003 | Mihara et al. .............. 382/118 |

OTHER PUBLICATIONS

Austrian Search Report dated Jul. 12, 2002 for Singapore Patent Application No. 9905429-8 (4 p.).

* cited by examiner

Primary Examiner—Yon J. Couso
(74) Attorney, Agent, or Firm—Conley Rose, P.C.

(57) ABSTRACT

A method, apparatus, and computer program product for estimating face direction using a single gray-level image (110, 150) of a face are described. Given the single image (110, 150), a face direction can be determined by computing a nose axis (140, 180) maximising a correlation measure between left and right sides (120, 130; 160, 170) of the face. The correlation measure is computed by comparing one of the two sides (A) with another synthetic side (C) derived from the other side (B) using symmetry and perspective transforms. Optionally, this process can be accelerated using a contrast enhancement algorithm taking advantage of the circumstances that the nose is the part of a face reflecting the most light and that this reflected light is represented as a line-like region close to the real nose axis. The computation result is a word describing the spatial position of the face and combining height ("up", "normal", "down") and neck-rotation ("left", "frontal", "right").

23 Claims, 7 Drawing Sheets

FACE DIRECTION ESTIMATION USING A SINGLE GRAY-LEVEL IMAGE

FIELD OF THE INVENTION

The present invention relates to the fields of face recognition and gesture detection.

BACKGROUND

Head pose estimation is generally addressed as a three-dimensional problem, where the studied parameters concern the three ways of rotating a head. The main uses of estimating head poses concern the man-machine interface, face recognition, teleconferencing for low bit-rate transmission, virtual reality, and the construction of a three dimensional model of a face to simulate and display synthetic facial expressions. Conventional efforts have focused principally on developing hardware-based, three-dimensional (3D) image acquisition systems. Basically, such systems obtain 3D information using two different images of the same object. In the case of stereovision, two calibrated cameras are used. The society Eyetronics® has proposed Shape-Snatcher©, a low-cost 3D-acquisition system that uses a single camera coupled with a slide projector. A grid is projected onto the object and distortion of the observed grid is composed with the original grid. In this manner, 3D information can be reconstructed.

A number of patents deal with various aspects of head pose estimation including face location, face tracking, facial feature location, detection of eyes, detection of lips, face recognition, age classification of human faces, facial animation, facial motion tracking, synthesis of facial expressions for toys or figurine, and the like. Except for face location or face tracking, where the face is considered as a region of the image verifying given properties, the other systems consider the face to be acquired in a frontal view, like a mug-shot photo.

An important challenge for face recognition systems is to recognise a face under varying poses. There are two streams of research in this field. The first one tries to transform (using image processing) off-frontal views of faces into frontal views and applies well-known frontal face recognition algorithms. The second stream of research tries to identify the pose of the face using a recognizer trained on a specific pose(s).

Hattori, K., Matsumori, S., and Sato, Y., "International Conference on Pattern Recognition", 1998, pp 1183-1187, Brisbane, describe an analog system. The hardware-based face measurement system uses a light source in a dark room, a color CCD camera, and two laser scanners on both sides of the camera. The system obtains a precise 3D model of the face, and head pose estimation can be computed.

A number of publications deal with head pose estimation algorithms, largely based on 3D image acquisition devices. One publication on face pose detection uses a single grey level image and neural networks to classify face images into a few categories: left, frontal, and right. One publication describes a system of pose discrimination based on the support vector machine using a single grey-level image. This approach uses a statistical method, based on a multi-dimensional linear classification, used on the whole face image. The output is a qualitative response among the three poses: "left", "frontal", "right". However, this system does not provide a quantitative measure of face direction, does not provide vertical directions, and cannot be further extended for facial gesture recognition.

Systems for transforming facial images from off-frontal to frontal include (1) Feng, G.C Yuen, P.C. and Lai, J.H., "A New Method of View Synthesis under Perspective Projection", *Proceedings of the 2nd International Conference on Multi-modal Interfaces*, pp IV-96, IV-101, Hong-Kong 1999, and (2) Maruyama, M., Asano, S., and Nakano, Y., "Face Recognition by Bi-directional View Synthesis", *Proceedings of the 14th International Conference on Pattern Recognition*, pp 157-159, Brisbane, Australia, 1998. Each of these documents describes methods for transforming off-frontal faces into frontal faces. Each of these techniques aims is to improve facial recognition performance alone. Disadvantageously, each of the documents teaches transforming an image before facial recognition is carried out on the image. Such transformations create a noisy image, as may be observed from the results listed obtained in each document, leading to errors in facial recognition Systems for 3-D pose estimation using a single camera are described by each of (1) Park, K.R., Nam, S.W., Han, S.C. and Kim, J., "A Vision-Based Gaze Detection Algorithm", *Proceedings of the 2nd International Conference on Multi-modal Interfaces*, pp IV-47, IV-50, Hong-Kong 1999, (2) Chen, Q., Wu, H., Shioyama, T., Shimada, T. and Chihara, K., "A Robust Algorithm for 3D Head Pose Estimation", *Proceedings of the 14th International Conference on Pattern Recognition*, pp 1356-1359, Brisbane, Australia, 1998, and (3) Wu, H., Shioyama, T. and Kobayashi, H., "Spotting Recognition of Head Gestures from Color Images Series", *Proceedings of the 14th International Conference on Pattern Recognition*, pp 83-85, Brisbane, Australia, 1998. Each of these documents describes 3D head pose estimation using a single camera. In each document, skin color and hair color regions are generally used to establish the 3D-parameters. Information about the skin and the hair color region is used to estimate the pose of the head, because the two types of information can be robustly extracted from color images and both are not sensitive to the changes of facial expression, wearing glasses, and other local changes of facial features. A skin region is represented with the Skin Color Distribution Model, and a hair region is represented with the Hair Color Distribution Model.

Secondly, the foregoing systems each approximate the head as a 3D-elliptical sphere and compute primary and secondary moments of these two regions to derive the 3D-head pose. The tilt is just the principal axis of the face region, and the two other rotations ("up-down", "left-right") are expressed using third order polynomials depending on the horizontal and vertical distance of the centroid of the face region with the centroid of the skin region. These two polynomials and their specific coefficients have been learnt statistically and are fixed. Disadvantageously, these methods require a crucial segmentation step. Segmentation can fail easily in certain. circumstances such as complex background or for a person without hair. Accordingly, each of these techniques has significant limitations and is not robust. Kuno, Y., Adachi, Y., Murashima, T., and Shirai, Y., "Intelligent Wheelchair Looking at Its User", *Proceedings of the 2nd International Conference on Audio- and Video-based Biometric Person Authentication*, pp-84-89, Washington, 1999, describe a system for determining face direction using a tracking algorithm. This system involves the detection of the face direction to guide an intelligent wheelchair, which is proposed as an alternative to the computation of the face direction. In this system, the face is tracked. If the face turns, the wheelchair turns. Precise computation of the degree of face turning is not required and they do not consider "up-down" movement, because the camera is always below the face of the user. The system detects roughly the eyes, the eyebrows, the nostrils, and the two mouths corners. These points are materialized by square regions and, to compute the face direction, the relative position of these squares is compared with squares of the same frontal face. Moreover, these squares are tracked throughout sequence of images, stabilizing their extraction. The system uses several frames to decide the face direction and does not give a quantitative result.

Huang, J., Shao, X., and Wechsler, H., "Face Pose Discrimination Using Support Vector Machine (SVM)" *Proceedings of the 14th International Conference on Pattern Recognition*, pp 155-156, Brisbane, Australia, 1998, describes a system of pose discrimination based on the support vector machine using a single gray level image. This approach uses a statistical method based on a multi-dimensional linear classification, used on the whole face image. The output is a qualitative response among the three poses: "left", "frontal", "right". However, this system does not provide a quantitative measure of face direction, does not provide vertical directions, and cannot be further extended for facial gesture recognition.

In the field of the video conference systems, several patents including U.S. Pat. Nos. 5,500,671, 5,359,362, and 5,675,376, and publications deal with the gaze detection and the line of sight estimation of the conferees. The purpose is to send to the conferee, the face image of an interlocutor, permitting communications with eye-to-eye contact. In the videoconference systems, conventional methods consider that the face is frontal and make intensive use of the gaze detection to provide eye-to-eye communications between the conferees. Generally speaking, the systems seek to ensure that the faces transmitted through the communication networks looks satisfying. Using the face direction estimation, more than the gaze detection, it is possible to enhance the quality of the transmitted images by generating a frontal view when the face is off-frontal, or by sending a pre-registered frontal face, or by unchanging the current satisfying frontal face which is displayed.

Thus, a need clearly exist for an improved system of recognizing faces from single images and for determining facial gestures.

SUMMARY

The aspects of the invention enable, given a single digital image of a person's face, the determination of a face direction by computing a nose axis. The nose axis maximizes a correlation measure between left and right sides of the face. The correlation measure is computed by comparing one of the two sides with another synthetic side derived from the other side using symmetry and perspective transforms on the second side. Optionally, this process can be accelerated using a contrast enhancement algorithm, which takes advantage of the circumstances that the nose is the part of the face between the eyes which reflects the most light and that this reflected light is represented as a line-like region close to the real nose axis. Preferably, the result of this computation is a word describing the spatial position of the face and combining height ("up", "normal", "down") and neck-rotation ("left", "frontal", "right").

Further, for a sequence of images, direction changes and facial gestures are detected by tracing the face direction. Still further, face recognition accuracy can be improved using face direction detection.

In another aspect of the invention, a visual mouse is provided using the face direction detection method as an interface for applications, such as interactive games, training, and the like.

In yet another aspect of the invention, there is provided a video conferencing method providing eye-to-eye contact communications using the face direction to enhance the quality of facial images.

BRIEF DESCRIPTION OF THE DRAWINGS

In the following description, embodiments of the invention are described with reference to the drawings, in which.

DETAILED DESCRIPTION

Figure 1:
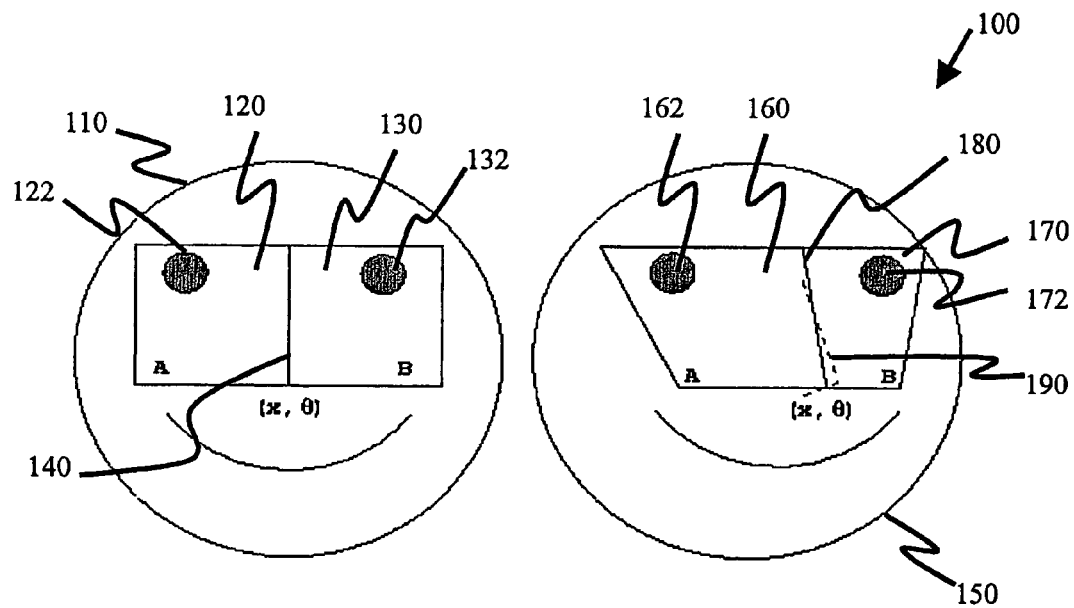
FIG. 1 is symbolic diagram of a correlation window corresponding to segment $(x,\theta)$ for two images, being a frontal case and a right-rotated case of a face, in accordance with the embodiments of the invention.

A method, an apparatus, and a computer program product for estimating face direction using a single gray-level image of a face are described. Also, a method, an apparatus, and a computer program product for determining facial gestures are described. In the following description, numerous details are set forth. It will be apparent to one skilled in the art, however, that the present invention may be practised without these specific details. In other instances, well-known features are not described in detail so as not to obscure the present invention.

For ease of description, the embodiments of the invention are each described or referred to as a "system". Components of the system can be implemented as modules. A module, and in particular the module's functionality, can be implemented in either hardware or software. In the software sense, a module is a process, program, or portion thereof, that usually performs a particular function or related functions. In the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the system can also be implemented as a combination of hardware and software modules.

OVERVIEW OF EMBODIMENTS

The embodiments of the invention use a single camera and do not require special devices like the one to acquire three dimensional (3D) information. The embodiments do not aim to define the 3D position of the head, but instead classify the direction of the face using a single digital image. Using this face direction, the embodiments can use a direction-dependent face recognition algorithm combining successive images and analyzing head gestures to select only the frontal faces to build a face database or provide a face database with an automatic indexing according to face direction.

The embodiments of the invention improve the accuracy of face recognition by taking into consideration variation of face directions. When face direction is estimated, the effect can be greatly reduced by using orientation-specific recognition algorithms based on a face database with face orientation as one of the database's indexes. In at least one of the embodiments, face direction detection is the first step toward face gesture ("yes", "no", "good") detection. At least one of the embodiments of the invention uses face orientation and gestures to enable a multi-modal interface. Face orientations and gesture information can be provided for applications such as face recognition and multi-modal interfaces.

The embodiments of the invention address two significant problems. The first problem is that the same face in different orientations (two images) can be less similar than two different faces in the same orientation. Head pose estimation allows comparison of two faces when they are in the same orientation and reduces the false recognitions to enhance good recognitions and accelerate overall computation time. The other problem is that glasses are geometrically symmetrical and provide good geometrical information. To proceed to reliable detection of the glasses, a nose axis is used to compute the perspective symmetry of contours.

The embodiments of the invention have a number of advantages. Firstly, the embodiments are relatively inexpensive and are both fast and easily implemented because the embodiments use a single image. The embodiments of the invention enable an active system to be built with the faces only in a given position, prior to face recognition, thereby reducing the size of a database, the number of errors, and the processing time during recognition. Secondly, the embodiments of the invention provide a qualitative and quantitative measure of the face direction. The result can be displayed on the face, by drawing the estimated nose axis, thereby easily interfacing with a supervised learning system allowing a human to input feedback. Thirdly, the embodiments do not rely on a segmentation process. The important information is the eye positions to initialize the search space for a symmetrical computation.

The advantages of the embodiments of the invention arise from a number of aspects including, based on an affine correlation measure, symmetry of the face and the perspective projection when the face is tilted. This greatly simplifies processing, and the output is qualitative, quantitative and visually meaningful. The estimation of face direction can be used as a filter for the recognition, or as a token generator for the face gesture expression, a face gesture being a set of tokens.

The embodiments of the invention are described hereinafter with reference to FIGS. 1-8.

FLOW DIAGRAM ILLUSTRATING PROCESS OF EMBODIMENTS

Figure 7:
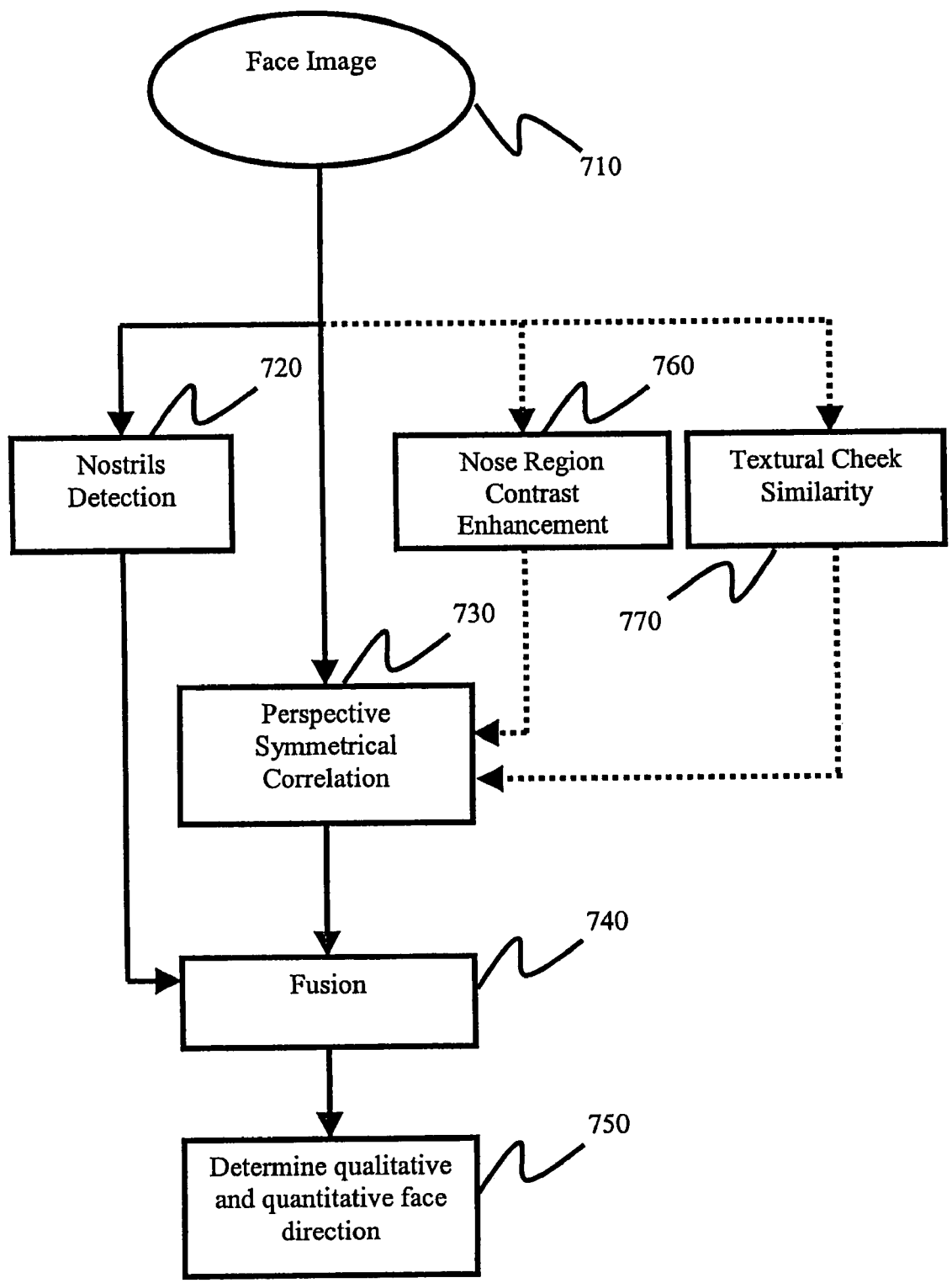
FIG. 7 is a flow diagram of the method of estimating face direction using a single grey-level image of a face in accordance with embodiments of the invention.

FIG. 7 is a flow diagram illustrating a process of estimating face direction using a single grey-level image 710. Using the face image 710, step 720 detects the nostrils of the face. This is preferably done in parallel with step 730 for determining a perspective symmetrical correlation on the face. Following steps 720 and 730, the outputs of steps 720 and 730 are fused together in step 740.

In step 740, the perspective symmetrical correlation produced by step 730 is used to estimate the neck rotation quantitatively and qualitatively. Also, the nostrils are used to establish the "up", "normal", and "down" position quantitatively and qualitatively from step 720. The fusion of step 740 involves combining the two qualitative and quantitative decisions by concatenation. For example, from (left, 10) and (up, 10), (left, 10, up, 10) means that the head is neck-left-rotated 10 degrees and up-rotated 10 degrees. In step 750, qualitative and quantitative face directions are determined.

Optionally, nose region contrast enhancement using the face image 710 can be performed in step 760. Also, textural cheek similarity in the face image can be determined optionally in step 770. Processing continues from steps 760 and 770 to step 730. Step 760 and/or 770 can be performed to accelerate the process of estimating face direction using a single grey-level image 710. Details of operations or steps carried out in FIG. 7 are described hereinafter.

Face Direction Estimation Using Nose Axis

FIG. 1 is a symbolic representation 100 of two images 110 and 150, the former being a frontal view and the latter being a right rotated view. Given a single image 110 of a person's face, face-direction estimation can established by computing a nose axis. The nose axis maximizes a measure of correlation between the left side (A) 120 and the right side (B) 130 of the face (an eye 122, 132 is shown in each side). This correlation measure is computed by comparing one side of the face with another synthetic side (step 730 of FIG. 7), the latter being obtained by symmetry and perspective transforms of the second side.

In particular, given a grey-level image of a human face (face image 710 of FIG. 7) that is normalized under rotation, translation and scale, an optimal segment (x,θ) 140 is searched for. The parameter x is the x-coordinate of the segment's middle. The parameter θ is the angular deviation from the vertical axis. This segment (x,θ) 140 maximizes a correlation measure, which describes the similarity between a sub-image 120 present at the left side of this segment and another sub-image 130 present at the right side of this segment. When the face is in a frontal position 110, the two sub-images have the same size and are rectangular. However, when the face 150 is left- or right-rotated (left-rotated in FIG. 1), the two areas 160, 170 (each containing an eye 162, 172) have different sizes and are not any longer rectangular, but are rather trapezoidal. The nose 190 (indicated with a dashed line) is shown in relation to the segment 180 in the image 150.

Preferably, the result of this computation is a word that describes a spatial position of the face combining the height ("up", "normal", "down") and the neck-rotation ("left", "frontal", "right").

Optionally, this process can be sped-up using a contrast enhancement technique (step 760 of FIG. 7), taking benefit of the fact that a nose is the part of the face between the eyes that reflects the most light. This reflected light is represented as a line-like region, close to the real nose axis. Optionally, textural cheek similarity can be used to accelerate the process.

Linear Mapping for Side of Face

Figure 2A:
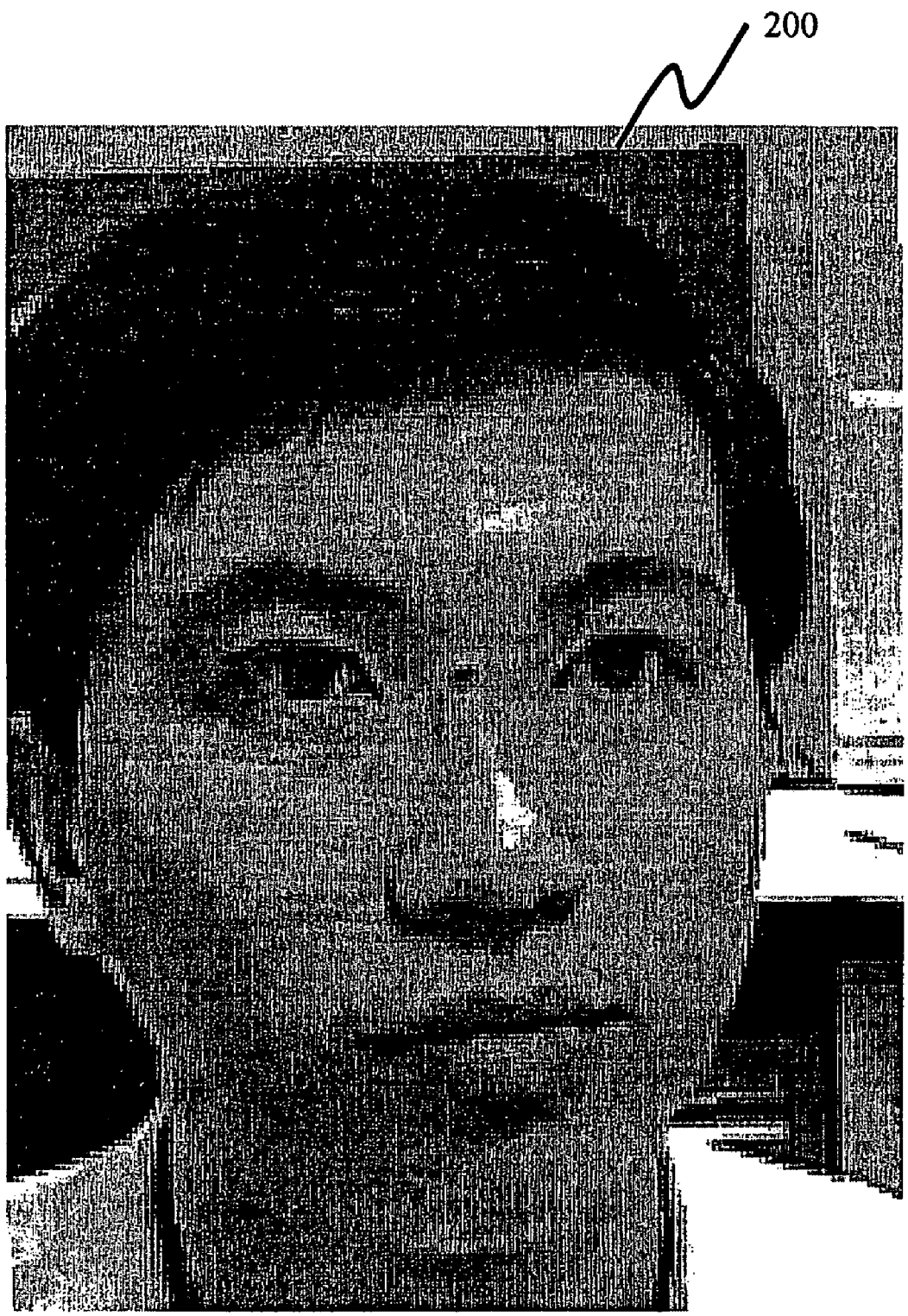
FIGS. 2A and 2B are a gray-scale image of a person's face and a corresponding depiction of a linear mapping depending on $(x,\theta)$ in accordance with the embodiments of the invention.
Figure 2B:
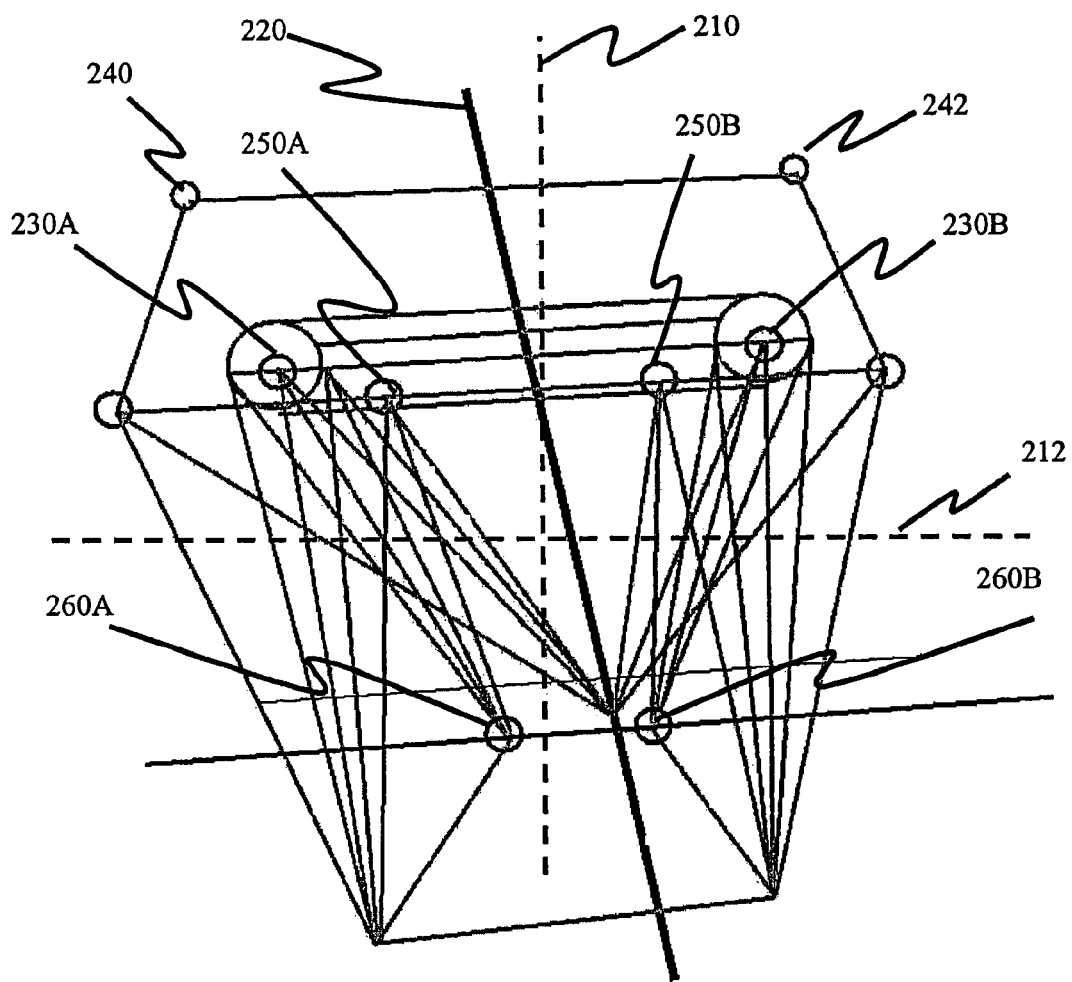
Figure 5:
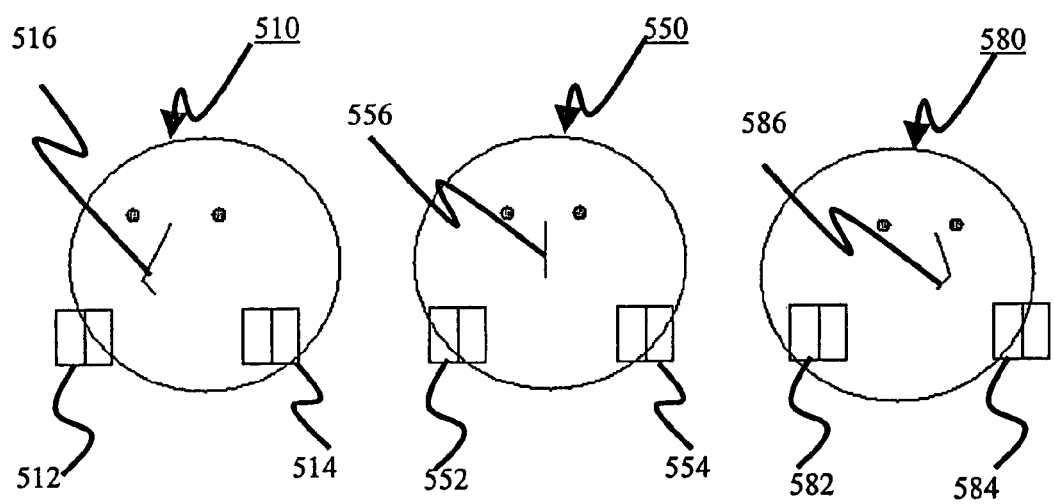
FIG. 5 is a symbolic diagram illustrating an optional method for face direction classification in accordance with the embodiments of the invention.

FIG. 2B depicts an example of the construction of a linear mapping that depends on $(x,\theta)$ from a face 200 shown in FIG. 2A. The system utilises predefined eye positions. To establish this trapezoidal region, several faces have been collected at different orientations, several landmark points (240, 242) like the center of the eyeballs (230A, 230B) have been manually selected, the inner-corner eyes, the corners of the mouth and the nostrils have been selected; also, the nose axis is manually selected. The landmarks are defined by the small circles (230A, 230B, 240, 242), the solid line 220 is the nose axis and the two dashed lines 210, 212 represent reference axes. Landmarks 230A and 230B represent the person's eyes. Other landmarks 250A and 250B represent the person's inner-corner of the eyes, and landmarks 260A and 260B represent the corners of the person's mouth. Further landmarks may include the person's nostrils for example. The parameters of the linear mapping, which transforms the region A into the region B, are estimated. The properties of the perspective projection allow the accurate estimation of parameters.

In the case of the frontal view, the correlation of the sub-image (A) 120 and the reflected sub-image (B) 130 is expected to be quite high, confirming the fact that $(x,\theta)$ is the nose axis and the face is frontal. In the general case, where $(x,\theta)$ is the real nose axis, the smaller region B is considered to be a "compressed" version of the reflected image A in respect to $(x,\theta)$, and the bigger region A is an "extrapolated" version of the reflected image B in respect to $(x,\theta)$. Therefore, there are three possible measures of correlation:

i) between the sub-image B and a "compressed" and reflected image of sub-image A;
 ii) between sub-image A and the "extrapolated" and reflected image of sub-image B; and
 iii) between the "extrapolated" and reflected sub-image B on a support U and the "compressed" and reflected image of sub-image A on the support U.

In the first case, the support U is A, and in the second case, the support U is B. The third case is a general one.

The foregoing three definitions are suitable for the computation of the correlation, which requires that the two sets (here, the two images) have the same size. The three cases are described more precisely as follows:

i) Sym(A,B)=Correlation(A',B), where A'=CR(A/B),
 ii) Sym(A,B)=Correlation(A,B'), where B'=ER(B/A), and
 iii) Sym(A,B)=Correlation(A',B'), A'=CR(A/U) and B'=ER(B/U) for a given support U, where CR(A/B) is a reflection about $(X,\Theta)$ and compression of the image A on the support B, and ER(A/B) is the reflection about $(X,\Theta)$ and extrapolation of the image A on the support B.

When the first case is considered, a many-to-one transformation is applied to the reflected version of A, which means that, at one point of the transformed image, the transformed image corresponds to many points of A. Conversely, when the second case is considered, there is a one-to-many case. Unlike the one-to-many transformation, the many-to-one case is common in image processing and is implemented using simple and efficient decision rules (e.g., the mean value, the median value, and the like).

Computation of Many to One Transformation

Figure 3:
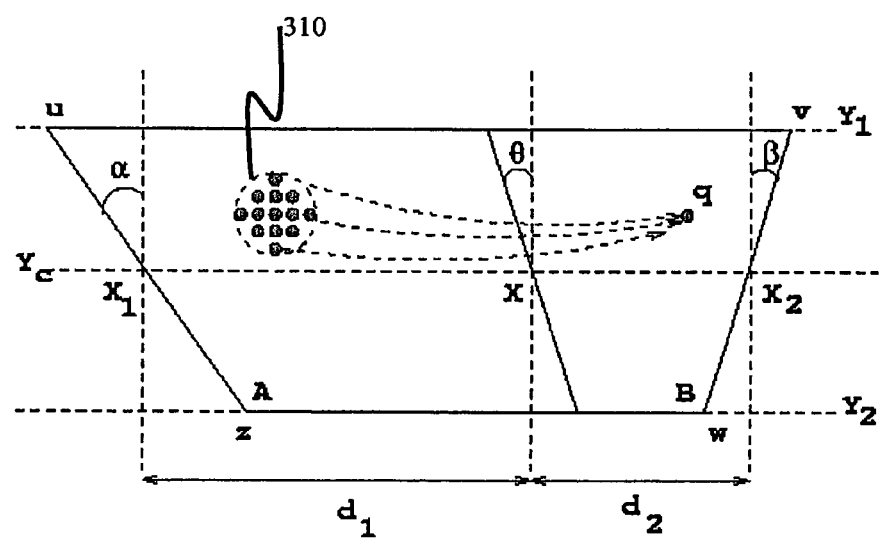
FIG. 3 is a diagram illustrating parameters of the correlation window of FIG. 1 and the computation of symmetrical points in accordance with embodiments of the invention.

Preferably, the many-to-one transformation shown in FIG. 3 is chosen, constructing a "compressed" version of the reflected image of sub-image A. The point q of sub-image B results from the many-to-one mapping of the set of points 310 in sub-image A. The parameters (u, v, w, z),$\alpha,\beta$, are uniquely defined, depending on the value of $(x,\theta)$.

Figure 8A:
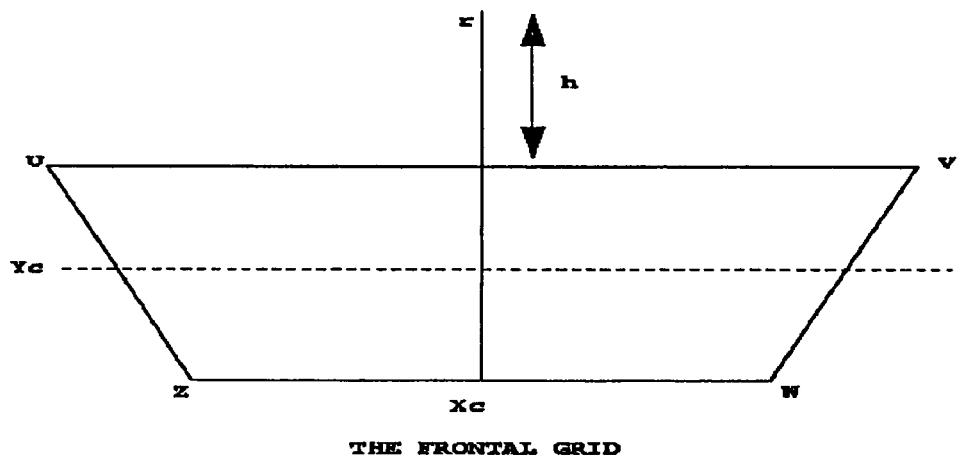
FIGS. 8A, 8B, and 8C illustrate the interrelationships of the parameters $(u, v, w, z)$ with $(x, \theta)$ of FIG. 3.
Figure 8B:
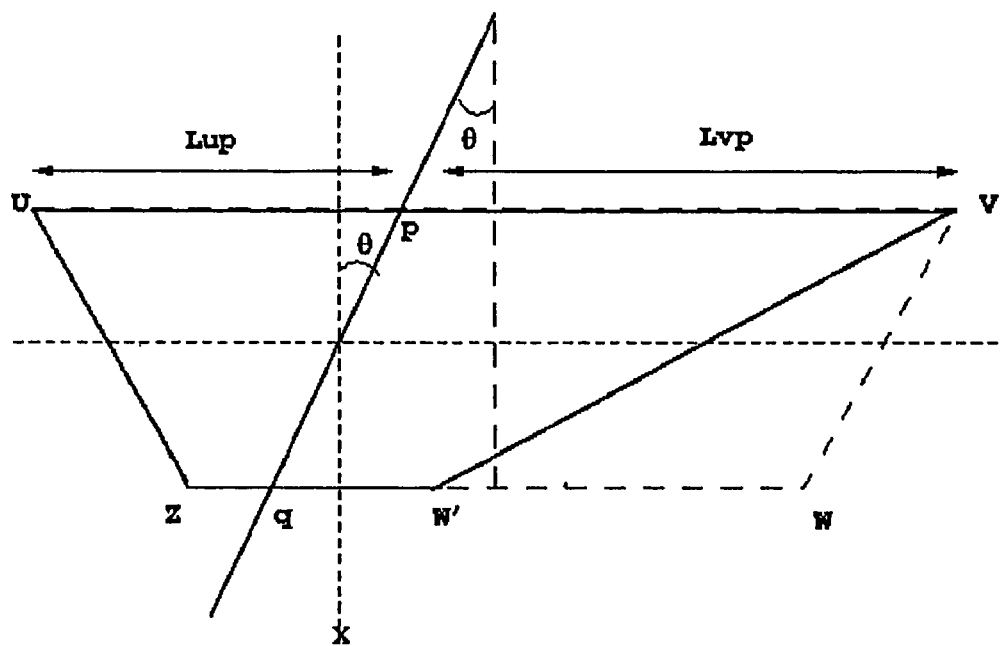
Figure 8C:
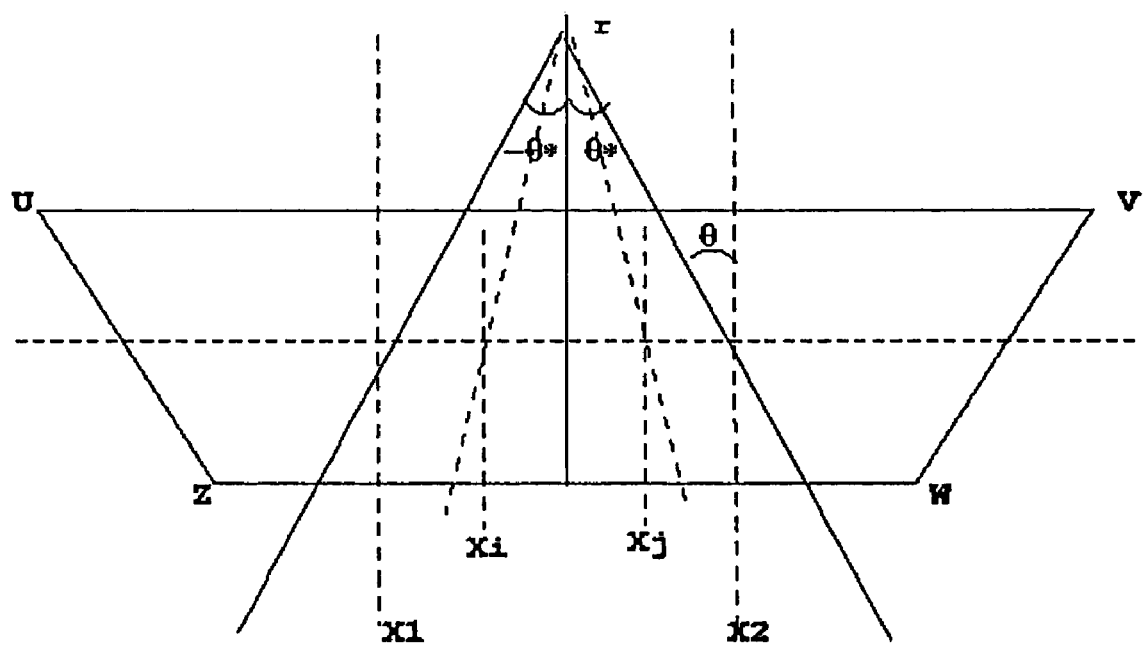

FIGS. 8A-8C describe the interrelationships of the parameters (u,v,w,z) and $(x,\theta)$. FIGS. 8A and 8B describe the grid and its parameters, r and $\theta^*$. Referring to FIG. 8A, the frontal grid is defined by the trapezoid (u,v,w,z) and the vertical axis Xc. The points u, v, w, and z are fixed according to the eyes positions. The vertical axis Xc denotes the nose axis in the frontal position, ie when $\theta=0$. The horizontal line Yc (depicted with a dashed line) passes through the middle of segments [uz] and [vw]. The point r is a fixed parameter of the system and is placed on the line (Xc) at a height h from the segment [uv]. The point r is used to produce all the others grids $(x,\theta)$.

Referring to FIG. 8B, a new right-rotated grid $(x,\theta)$ is generated by performing the following steps:
 1. Rotate the vertical axis Xc by an angle $\theta$ about the center of rotation r to obtain Xc' (i.e. line passing through points p and q).
 2. Obtain the length of the segment [up], [vp] and [zq], i.e. Lup, Lvp and Lzq, respectively. Xc' intersects [uv] at the point p and [zw] at the point q. The value of x is the abscissa of the intersection of Xc' and Yc (the dashed horizontal line).
 3. Compute a new point W', the transform of W, such that Lw'q/ Lzq=Lvp/Lup, where Lw'q is the length of the segment [W'q] for a given W'. Finding W' is simply done by translating the point q along the segment [zw] by a length equal to Lzq multiplied by the scaling factor Lvp/Lup. At the end, the grid $(x,\theta)$ is obtained defined by the polygon (u,v,w',z).

The same approach can be applied for the left-rotated grid by find the point z', the transform of z, such that Lz'q/Lwq=Lup/Lvp.

FIG. 8C illustrates the maximal angle $\theta^*$ allowed for the left- and right-rotated grid. The maximal angle defines the two extreme nose axes (X1,$-\theta^*$) and (X2,$\theta^*$). The set of nose axes explored $\{(x,\theta)\}$ is defined such that $x \in [X1,X2]$ and $\theta \in [-\theta^*,\theta^*]$.

Figure 4:
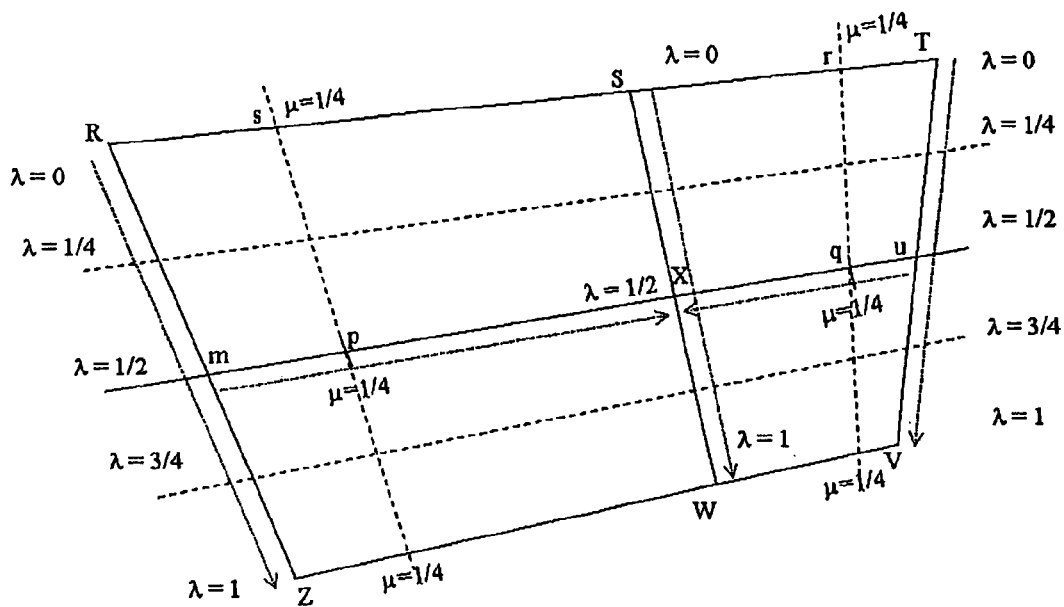
FIG. 4 is a diagram illustrating in further detail the computation of symmetry using perspective symmetry in accordance with the embodiments of the invention.

FIG. 4 depicts the transformation of FIG. 3 in greater detail for computing the reflected point of a point q. Also, a strategy to affect a grey level value for this point is described. The computation is simple using a parametric representation of the coordinates and the properties of the perspective projection. First, the computation for a given point situated in the segment [uX] is described. This computation is generalised for all the points of the smaller region, defined by the polygon (S, T, V, W).

In the FIG. 4, the point q belongs to the segment [uX], where u is the middle of the segment [TV] and X is the middle of the segment [SW]. According to the properties of the perspective projection and the cross-ratio, the line (uX) intersects the segment [RZ] at the point m, the middle of [RZ]. Generally, for a given $\lambda, 0 \leq \lambda \leq 1$. The points u of the segment [TV] and x of the segment [SW] are defined such that:

$$\lambda = \frac{\|Tu\|}{\|TV\|} = \frac{\|Sx\|}{\|SW\|}. \tag{1}$$

The line (ux) intersects the segment [RZ] at the point m, which keeps the proportionality ratio λ:

$$\lambda = \frac{\|Tu\|}{\|TV\|} = \frac{\|Sx\|}{\|SW\|} = \frac{\|Rm\|}{\|RZ\|}. \quad (2)$$

Let q be a point of the segment [ux], such that the ratio of the length u is equal to:

$$\mu = \frac{\|uq\|}{\|ux\|}. \quad (3)$$

Because the reflection is an operation which keeps the distance ratio, the point p of the segment [mx] is obtained, reflected image of q about the point x, such that:

$$\mu = \frac{\|uq\|}{\|ux\|} = \frac{\|mp\|}{\|mx\|}. \quad (4)$$

Dealing with digital pictures, where the points' coordinates are integer values, this computation is insufficient. In this case, a many-to-one mapping is faced, where several pixels of the segment [mx] have the same image in the segment [ux]. Let λ and μ be the two current parameters, defining respectively the two segments [ux] and [xm], and the two segments [rq] and [sp]. A window $W_{\lambda,\mu}$ is defined centered in p, as an approximation of the theoretical set of points having the same image than p:

$$W_{\lambda,\mu} = (h, l) \text{ such that } h = \frac{\|sp\|}{\|rq\|}, \text{ and } l = \frac{\|mx\|}{\|ux\|}, \quad (5)$$

where h denotes the height and I denotes the length of $W_{\lambda,\mu}$.

To associate a grey-level value with the point q (image of the point p), a decision rule is applied to the grey-level value of the pixels contained in the window $W_{\lambda,\mu}$. The weighted mean value of the grey levels is used, considering the window as a digital approximation of a gaussian bell, centered at each point p, the image of q. Therefore, using the polygon (S, T, V, W) defining the region B, the region C is constructed also defined on the polygon (S, T, V, W), which is the image of A=(R, S, W, Z). For each point q of C, image p in (RSWZ) is computed and affects the grey level g(q) of q:

$$g(q) = \sum_{u \in W_{\lambda,\mu}} w(u)g(p+u), \text{ with } \sum_{u \in W_{\lambda,\mu}} w(u) = 1, \quad (6)$$

where w(u) is the weight associated to the position u and g(p) is the grey level associated to the point p.

Finally, once C is constructed, the correlation between B and C is completed. The coefficient of correlation $p(X_1, X_2)$, between two random variables $X_1$ and $X_2$ is given by the following formula:

$$\rho(X, Y) = \frac{E(X, Y) - E(X)E(Y)}{\sigma(X)\sigma(Y)}, \text{ where} \quad (7)$$

$$E(X) = \frac{1}{N}\sum_{i=1}^{N} xi \text{ and } \sigma^2(X) = E(X^2) - E^2(X),$$

where E(X) denotes the mean value and σ(X) the standard deviation of the random variable X, defined using N samples $x_1, \ldots x_N$. The correlation coefficient is invariant under affine transformation of the variables, that is ρ(X1, X2)=ρ (X1, aX2+b), where a and b are two real numbers. Therefore, the linear change of the lighting conditions does not affect the computation of the correlation.

The search for an optimal nose axis involves selecting the couple (x*,θ*), for which the correlation is maximal over the possible nose axis:

$$(x^*, \theta^*) = \underset{(x,\theta)}{\operatorname{argmax}} \Gamma(x, \theta), \text{ where } \Gamma(u) = \rho(C(u), B(u)), \quad (8)$$

where C((x,θ)) is the reflected image of sub-image A((x,θ)), and sub-image B((x,θ)) is the smaller region delimited by the axis (x,θ).

Optional Acceleration of Nose Axis Determination

Two supplementary methods are preferably used to accelerate the computation of the nose axis. This is done by constraining the interval of variation of x and of θ:
1) nose contrast enhancement and segmentation of the brightest area (step 760 of FIG. 7); and
2) a textural similarity of cheeks (step 770 of FIG. 7).

Generally, the nose is a bright area, and the brightest part of the nose is close to the nose axis searched for. By contrast enhancement and morphological operations, this bright region can be isolated and used for focalization to speed-up and constrain the search for the nose axis. A log-compression of the grey levels in a defined region located between the eyes is used. Using a watershed algorithm (i.e., starting from the pixels having the brightest grey level and stopping the process when a grey level difference is sufficiently large) and coupling this segmentation with mathematical morphology operations (i.e., dilation and erosion), the nose axis can be isolated roughly. This region is wider than the nose axis and represents the most probable region to find the nose, or at least, very close to this region.

By computing the similarity between the left and right cheek in terms of textural information extracted from a smoothed image, it is possible to identify rapidly if the face is "almost" frontal, "almost" left rotated, or "almost" right rotated. When the face is rotated, one of the cheeks contains the background (complex or unique). An unsupervised learning algorithm and a Fisher linear discriminant analysis provide a statistical and reliable basis of this classification system. The feature vector used for classification has six components: the standard deviation of the two grey levels and the magnitude of the gradient for the two squares, and two measures of correlation (one for the two inner rectangles and one for the two squares). Again these two correlations are computed with the reflected coordinate system, but without any perspective. This vector is fed into the linear discriminant-classification system, and a rough classification between "left", "right" and "frontal" is provided (step 750 of FIG. 7).

Nostril Detection

Detection of nostrils is realized in a specific area, where a sigmoidal filter is applied resulting in a contrasted image and the average grey-level region, like the skin, becomes quite bright (see step 720 of FIG. 7). A minimum filter is then applied to enlarge the dark areas. When visible in the image, the nostrils are present within this dark area and are darker than this area. By detecting a local minimum below a given threshold and applying region growing within a given range of the grey levels, the nostrils are isolated and identified as small, circular dark areas. The centroids of these areas represent the nostrils. The search for the nostrils is constrained by the estimated "left", "frontal", or "right" position of the head, and the result of this detection is two, one or no nostrils at all.

In the case where the two nostrils are detected, the baseline of the nose is defined as a segment joining the two nostrils.

In the case where the nostrils are not detected (not visible in the image), the baseline of the nose is defined as the horizontal segment which passes through this dark area and which covers a satisfactory proportion of pixels of this dark area. The scan is realized within the bounding box of this dark area, starting from the upper segment defining the upper-horizontal side of the bounding box and going toward the lower segment defining the lower-horizontal side of the bounding box. The scan stops as soon as a satisfactory proportion of pixels of this dark area are covered by the considered segment. This segment is called the baseline of the nose.

In the case where only one nostril is detected, the baseline is defined as the unique horizontal segment passing through this centroid inside the bounding box of the dark area.

The nostrils, the baseline and the eye positions are used to decide if the face is "up", "normal", or "down" (step 750 of FIG. 7).

The parameter e is the distance between the eyes and the parameter d is the distance between the baseline of the nose and the segment joining the two eyes. Also, the parameters T and T1 are two preset thresholds, not necessarily equal. This results in the following:

| | |
|---|---|
| "Up" | is established when d/e < T and one or two nostrils are detected. |
| "Down" | is established when d/e < T1 and the two nostrils are not detected. |
| "Normal" | is established when: 1) one or two nostrils are detected and d/e >= T; or 2) no nostrils are detected and d/e >= T1; or 3) "Up" and "Down" are both rejected. |

This illustrates the case that the more the face is "up", the shorter is the distance d joining the nose to the eyes in a 2D image, and conversely the more the face is "normal", the greater d is. In the same way, the more the face is "Down", the shorter is the distance d joining the nose to the eyes in the 2D image and conversely the more the face is "normal" the greater d is.

Refinements of this vertical positioning are possible by defining several thresholds T1, T2, T3, . . . Here the ratio d/e provides a quantitative measure of the vertical tilt. It can be used as an entry in a look-up table to provide the real angular tilt, for example for d/e=T to obtain 0 degrees.

Direction Dependent Face Recognition and Database

One of the major factors affecting face recognition accuracy is the variation of the face directions. As the face rotates up and down, left and right, the facial images vary significantly. Because of this variation, a person's face is represented by a group of facial images rather than one particular facial image. Consequently, a person's face is represented by a group of points in feature space. This increases the possibility of intersection between faces in the feature space and leads to decreased recognition accuracy.

Figure 6:
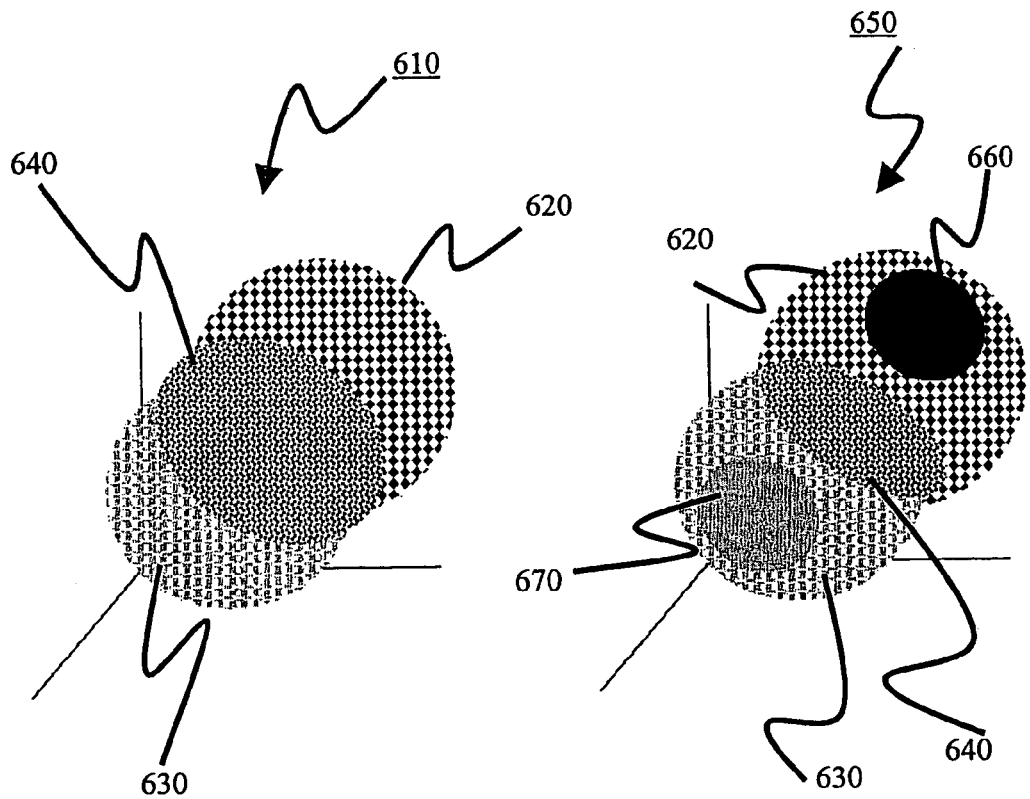
FIG. 6 is a symbolic diagram illustrating first and second cases of direction dependent face recognition, the second case involving spatial clustering to clearly identify different persons, in accordance with the embodiments of the invention.

FIG. 6 depicts direction dependent face recognition (step 750 of FIG. 7). The left portion 610 of FIG. 6 shows the overlap 640 of the representations 620, 630 of faces in the feature space without spatial clustering. After estimation of face orientation and using the face orientation as an index, recognition is carried out by matching faces with similar orientations. The overlap 640 of representations 620, 630 has been greatly reduced, and therefore the accuracy is significantly increased using spatial clustering. As shown in the right portion 650 of FIG. 6, using the orientation dependent face recognition algorithm, two persons (displayed as dense clusters 660, 670) can be better discriminated, thereby reducing the overlap 640 and improving the accuracy of the recognition.

Determination of Facial Gestures

By tracking a sequence of face images, facial gestures can be determined using the following steps:
1) Compute face direction changes, and label the changes as "left", "right", "up", and "down"; and
2) Establish a set of parsing rules to parse sequences of labels, for example:
   "Yes" is a sequence of down-up;
   "No" is a sequence of left-right or right-left;
   "Good" is a sequence of several cycles of "yes"

A gesture is analyzed using a sequence of images. Application of one-dimensional Hidden Markov Models (HMM), commonly used in speech recognition, provides an approach to analyze this succession of images and to interpret them as human gestures.

Computer Implementation

The embodiments of the invention are preferably implemented using general-purpose computers. In particular, the processing or functionality of FIGS. 1-8 can be implemented as software, or a computer program, executing on a computer. The method or process steps of for estimating face direction using a single gray-level image of a face and determining facial gestures are carried out by the computer. The software may be implemented as one or more modules for implementing the process steps. A module is a part of a computer program that usually performs a particular function or related functions. Also, as described hereinbefore, a module can also be a packaged functional hardware unit for use with other components or modules.

In particular, the software may be stored in a computer usable or readable medium, including a floppy disc, a hard disc drive, a magneto-optical disc drive, CD-ROM, magnetic tape or any other of a number of non-volatile storage devices well known to those skilled in the art. The software is preferably loaded into the computer from the computer usable medium and then carried out by the computer. A computer program product includes a computer usable medium having such software or a computer program recorded on the medium that can be carried out by a computer. The use of the computer program product in the computer preferably effects an advantageous system for virtual commodity trading.

The computer system can be connected to one or more other computers via a communication interface using an appropriate communication channel such as a modem communications path, a computer network, or the like. The computer network may include a local area network (LAN), a wide area network (WAN), an Intranet, and/or the Internet.

Numerous configurations of computer systems can be employed without departing from the scope and spirit of the invention. Computers with which the embodiment can be practised include IBM-PC/ATs or compatibles, the Macintosh (™) family of PCs, Sun Sparcstation (™), a workstation or the like. The foregoing is merely exemplary of the types of computers with which the embodiments of the invention may be practiced.

Typically, the processes of the embodiments are resident as software or a program recorded on a hard disk drive as the computer readable medium, and read and controlled using the computer system. In some instances, the program may be supplied to the user encoded on a CD-ROM or a floppy disk, or alternatively could be read by the user from the network via a modem device connected to the computer, for example. Still further, the software can also be loaded into the computer system from other computer readable medium including magnetic tape, a ROM or integrated circuit, a magneto-optical disk, a radio or infra-red transmission channel between the computer and another device, a computer readable card such as a PCMCIA card, and the Internet and Intranets including email transmissions and information recorded on web sites and the like. The foregoing is merely exemplary of relevant computer readable mediums. Other computer readable mediums may be practiced without departing from the scope and spirit of the invention.

Thus, a method, apparatus, and computer program product for estimating face direction using a single gray-level image a face, for determining facial gestures, and for video teleconferencing, and a visual mouse, have been described. While only a small number of embodiments are described, it will be apparent to those skilled in the art, in view of this disclosure, that numerous changes and/or modifications can be made without departing from the scope and spirit of the invention.

The Invention claimed is:

1. A method for determining a face direction of a person's face captured in a digital image, the method comprising the steps of:
   processing said digital image to determine a nose axis of said face in said digital image;
   processing said digital image to compute digital data representing a rotation of said face in said digital image based on said determined nose axis of said face;
   processing said digital image to compute digital data representing a tilt of said face in said digital image; and
   determining a quantitative face direction of said face in said image based on said data representing the rotation of said face in said image and said data representing the tilt of said face in said image.

2. The method according to claim 1, wherein the processing said digital image to determine the nose axis of said face in said digital image comprises determining said nose axis by maximizing a correlation measure between a left side and a right side of said face from left and right sub-images of said image.

3. The method according to claim 2, wherein the processing said digital image to determine the nose axis of said face in said digital image comprises comparing one of said left and right sides with a synthetic side derived from the other of said left and right sides using symmetry and a perspective transformation of said other side to compute said correlation measure.

4. The method according to claim 3, wherein the processing said digital image to determine further comprises applying a contrast enhancement algorithm to a nose region of said image, wherein said nose in the part of a face that reflects the most light, said reflected light being represented as a line-like region close to a real nose axis.

5. An apparatus for determining a face direction of a person's face captured in a digital image, the apparatus comprising:
   means for processing said digital image to determine a nose axis of said face in said digital image;
   means for processing said digital image to compute digital data representing a rotation of said face in said digital image based on said determined nose axis of said face;
   means for processing said digital image to compute digital data representing a tilt of said face in said digital image; and
   means for determining a quantitative face direction of said face in said image based on said data representing the rotation of said face in said image and said data representing the tilt of said face in said image.

6. The apparatus according to claim 5, wherein said means for processing said digital image to determine the nose axis of said face in said digital image determines said nose axis by maximizing a correlation measure between a left side and a right side of said face from left and right sub-images of said image.

7. The apparatus according to claim 6, wherein said means for processing said digital image to determine the nose axis of said face in said digital image compares one of said left and right sides with a synthetic side derived from the other of said left and right sides using symmetry and a perspective transformation of said other side to compute said correlation measure.

8. The apparatus of claim 7, wherein said means for processing said digital image to determine the nose axis of said face in said digital image applies a contrast enhancement algorithm to a nose region of said image, wherein said nose in the part of a face that reflects the most light, said reflected light being represented as a line-like region close to a real nose axis.

9. A computer readable medium that stores a computer program product for determining a face direction of a person's face captured in a digital image, the computer program product comprising:
   computer readable program code means for processing said digital image to determine a nose axis of said face in said digital image;
   computer readable program code means for processing said digital image to compute digital data representing a rotation of said face in said digital image based on said determined nose axis of said face;
   computer readable program code means for processing said digital image to compute digital data representing a tilt of said face in said digital image; and
   computer readable program code means for determining said quantitative face direction of said face in said image based on said data representing the rotation of said face in said image and said data representing the tilt of said face in said image.

10. The computer readable medium according to claim 9, wherein said computer readable program code means for processing said digital image to determine a nose axis of said face in said digital image maximizes a correlation measure between a left side and a right side of said face from left and right sub-images of said image.

11. The computer readable medium according to claim 10, wherein said computer readable program code means for processing said digital image to determine a nose axis of said face in said digital image compares one of said left and right sides with a synthetic side derived from the other of said left and right sides using symmetry and a perspective transformation of said other side to compute said correlation measure.

12. The method of claim 1, further comprising generating a plurality of quantitative face directions, wherein said generating the plurality of quantitative face directions comprises:
   obtaining a plurality of digital images of said face; and
   for each of said plurality of digital images:
      processing said each digital image to determine a nose axis of said face in said digital image
      processing said each digital image to compute digital data representing a rotation of said face in said digital image based on said determined nose axis of said face in said each image;
      processing said each digital image to compute digital data representing a tilt of said face in said each digital image; and
      determining a quantitative face direction of the face in said each digital image based on said data representing the rotation of said face in said each image and said data representing the tilt of said face in said each image;
   whereby a plurality of quantitative face directions is obtained.

13. The method of claim 1 further comprising providing a visual mouse to detect said quantitative face direction as an interface for a computer application.

14. The method of claim 1 further comprising providing said quantitative face direction as input to a computer application to provide eye-to-eye contact communication in video-conferencing.

15. The apparatus of claim 5, further comprising
   means for obtaining a plurality of digital images of said face; and
   wherein, for each of said plurality of digital images,
      said means for processing said each digital image to determine a nose axis of said face in said each digital image determines the nose direction of said face in said each digital image;
      said means for processing said each digital image to compute digital data representing a rotation of said face in said each digital image based on said determined nose axis of said face computes said digital data representing a rotation of said face in said each digital image based on said determined nose axis of said face in said each image;
      said means for processing said each digital image to compute digital data representing a tilt of said face in said each digital image computes said digital data representing said tilt of said face in said each digital image; and
      said means for determining a quantitative face direction of said face in said each digital image based on said data representing the rotation of said face in said each image and said data representing the tilt of said face in said each image determines said quantitative face direction of said face in said each digital image based on said data representing the rotation of said face in said each image and said data representing the tilt of said face in said each image;
   whereby a plurality of quantitative face directions is obtained.

16. The apparatus of claim 5 further comprising means for providing a visual mouse to detect the quantitative face direction as an interface for a computer application.

17. The apparatus of claim 5 further comprising means for providing said face direction as input to a computer application to provide eye-to-eye contact communication in video-conferencing.

18. The computer readable medium of claim 9, further comprising
   computer readable program code means for obtaining a plurality of digital images of said face;
   wherein, for each of said plurality of digital images,
      said computer readable program code means for processing said each digital image to determine a nose axis of said face in said each digital image determines the nose direction of said face in said each digital image;
      said computer readable program code means for processing said each digital image to compute digital data representing a rotation of said face in said each digital image based on said determined nose axis of said lace computes said digital data representing a rotation of said face in said each digital image based on said determined nose axis of said face in said each image;
      said computer readable program code means for processing said each digital image to compute digital data representing a tilt of said face in said each digital image computes said digital data representing said tilt of said face in said each digital image; and
      said computer readable program code means for determining a quantitative face direction of the face in said each digital image based on said data representing the rotation of said face in said each image and said data representing the tilt of said face in said each image determines said quantitative face direction of said face in said each digital image based on said data representing the rotation of said face in said each image and said data representing the tilt of said face in said each image;
   whereby a plurality of quantitative face directions is obtained.

19. The computer readable medium of claim 9 further comprising computer readable program code means for providing a visual mouse to detect the quantitative face direction as an interface for a computer application.

20. The computer readable medium of claim 9 further comprising computer readable program code means for providing said face direction as input to a computer application to provide eye-to-eye contact communication in video-conferencing.

21. The method of claim 12, further comprising:
   determining changes in face direction using said plurality of quantitative face directions;
   applying labels to said changes; and
   parsing a sequence of said labels to determine a facial gesture.

22. The apparatus of claim 15, further comprising:
   means for determining changes in face direction using said plurality of quantitative face directions;
   means for applying labels to said changes; and
   means for parsing a sequence of said labels to determine a facial gesture.

23. The computer readable medium of claim 18, further comprising:

computer readable program code means for determining face direction changes using said plurality of quantitative face directions;

computer readable program code means for applying labels to said changes; and computer readable program code means for parsing a sequence of said labels to determine a facial gesture.

* * * * *